(12) United States Patent
Gou et al.

(10) Patent No.: US 12,013,509 B2
(45) Date of Patent: Jun. 18, 2024

(54) METHODS AND SYSTEMS FOR ACQUIRING SEISMIC DATA OF FOUR-COMPONENT OCEAN BOTTOM NODE (OBN)

(71) Applicants: BGP INC., CHINA NATIONAL PETROLEUM CORPORATION, Hebei (CN); OPTICAL SCIENCE AND TECHNOLOGY (CHENGDU) LTD., Sichuan (CN)

(72) Inventors: Liang Gou, Baoding (CN); Gang Yu, Baoding (CN); Haibo Liu, Baoding (CN); Zhaohong Xu, Baoding (CN); Ximing Wang, Chengdu (CN); Shujun Xia, Baoding (CN); Shujie An, Baoding (CN); Mengxiong Xiao, Baoding (CN)

(73) Assignees: BGP INC., CHINA NATIONAL PETROLEUM CORPORATION, Baoding (CN); OPTICAL SCIENCE AND TECHNOLOGY (CHENGDU) LTD., Chengdu (CN)

( * ) Notice: Subject to any disclaimer, the term of this patent is extended or adjusted under 35 U.S.C. 154(b) by 0 days.

(21) Appl. No.: 18/395,727

(22) Filed: Dec. 25, 2023

(65) Prior Publication Data
US 2024/0125963 A1   Apr. 18, 2024

Related U.S. Application Data

(63) Continuation of application No. PCT/CN2022/077906, filed on Feb. 25, 2022.

(30) Foreign Application Priority Data

Sep. 30, 2021   (CN) .......................... 202111156782.4

(51) Int. Cl.
G01V 1/38   (2006.01)
G01V 1/20   (2006.01)

(52) U.S. Cl.
CPC ............ *G01V 1/3808* (2013.01); *G01V 1/201* (2013.01); *G01V 1/3835* (2013.01); *G01V 1/3852* (2013.01); *G01V 2001/204* (2013.01)

(58) Field of Classification Search
CPC .... G01V 1/3808; G01V 1/201; G01V 1/3835; G01V 1/3852; G01V 2001/204
See application file for complete search history.

(56) References Cited

U.S. PATENT DOCUMENTS 5,497,356 A * 3/1996 Norton, Jr. ................ G01S 5/30
                                                           367/19
10,620,329 B2 * 4/2020 Herrmann .............. G01V 1/189
(Continued)

FOREIGN PATENT DOCUMENTS

CN   106680877 A   5/2017
CN   109298452 A   2/2019
(Continued)

OTHER PUBLICATIONS

First Office Action in Chinese Application No. 202111156782.4 mailed on May 25, 2023, 26 pages.
(Continued)

*Primary Examiner* — Krystine E Breier
(74) *Attorney, Agent, or Firm* — Porus IP LLC

(57) ABSTRACT

The present disclosure provides a method and a system for acquiring seismic data of a four-component ocean bottom node (OBN). The method is implemented by the system, comprising controlling installations of a plurality of ocean bottom submerged buoys and a plurality of four-component OBN seismic data acquisition instruments and sending positioning signals and timing signals to the plurality of ocean
(Continued)

bottom submerged buoys through armored opto-electronic composite cables. The method also includes obtaining real-time and uninterrupted water temperature data, pressure data, density data, and salt saturation data along the armored opto-electronic composite cables from the ocean surface to locations of the plurality of ocean bottom submerged buoys, and calculating real-time and three-dimensional data of waters of a whole measurement work area through interpolation. The method further includes performing real-time correction on a hydroacoustic velocity of each hydroacoustic propagation trajectory based on the location, the hydroacoustic propagation trajectory and the three-dimensional data of each acquisition instrument.

1 Claim, 4 Drawing Sheets

(56) References Cited

U.S. PATENT DOCUMENTS

| | | | |
|---|---|---|---|
| 2011/0149682 A1* | 6/2011 | Martin | G01V 1/3835 367/19 |
| 2016/0018546 A1* | 1/2016 | Eick | G01V 1/3852 367/24 |
| 2016/0124105 A1 | 5/2016 | Valsvik et al. | |
| 2018/0100939 A1* | 4/2018 | Cocker | G01V 1/3808 |
| 2018/0335537 A1 | 11/2018 | Goujon | |
| 2020/0217975 A1 | 7/2020 | Santos et al. | |
| 2020/0257009 A1* | 8/2020 | Pei | B63B 22/00 |

FOREIGN PATENT DOCUMENTS

| | | | |
|---|---|---|---|
| CN | 111323810 A | 6/2020 | |
| CN | 112666599 A | 4/2021 | |
| CN | 113391343 A | 9/2021 | |
| CN | 113759423 A | 12/2021 | |
| GB | 2491700 A * | 12/2012 | G01V 1/166 |
| WO | WO-2014076075 A2 * | 5/2014 | B63G 8/001 |
| WO | 2021178942 A1 | 9/2021 | |

OTHER PUBLICATIONS

Notification to Grant Patent Right for Invention in Chinese Application No. 202111156782.4 mailed on Sep. 27, 2023, 6 pages.

Wang, Liangsi, Study on Discrete-axes 4-Component Fiber Optic Geophone System Based on Heterodyne Detection Scheme, Chinese Master's Theses Full-text Database, Basic Sciences, 2016, 64 pages.

International Search Report in PCT/CN2022/077906 mailed on Jun. 29, 2022, 8 pages.

Written Opinion in PCT/CN2022/077906 mailed on Jun. 29, 2022, 8 pages.

Liu, Jingnan et al., Development and Trends of Marine Space-Time Frame Network, Geomatics and Information Science of Wuhan University, 44(1): 17-37, 2019.

* cited by examiner

METHODS AND SYSTEMS FOR ACQUIRING SEISMIC DATA OF FOUR-COMPONENT OCEAN BOTTOM NODE (OBN)

CROSS-REFERENCE TO RELATED APPLICATIONS

This application is a Continuation of International Application No. PCT/CN2022/077906, filed on Feb. 25, 2022, which claims priority of the Chinese Patent Application No. 202111156782.4, filed on Sep. 30, 2021, the entire contents of which are hereby incorporated by reference.

TECHNICAL FIELD

The present disclosure relates to the technical field of marine geophysical exploration, and in particular, to a method and a system for acquiring seismic data of a four-component node.

BACKGROUND

Marine seismic exploration is a method of conducting seismic exploration in the ocean using an exploration vessel. The principles of marine seismic exploration, the used instruments, and the methods for processing data are essentially the same as those used in land seismic exploration. As a type of marine seismic exploration technology, seabed seismic exploration technology also consists of seismic sources and acquisition instruments. Seabed seismic exploration technology mostly employs non-explosive seismic sources (primarily airguns), which float near the sea surface and are towed by offshore seismic exploration vessels. The acquisition instruments are placed on the seafloor to receive the longitudinal and transverse wave signals emitted by the seismic sources and reflected by the seafloor bottom layer. Since seawater cannot propagate transverse waves, the transverse and refracted waves can only be received by placing the detectors on the seafloor, which is characterized by excitation and reception in water, with uniform excitation and reception conditions. Continuous observation without stopping the vessel may be conducted. Originally, piezoelectric detectors were used, but now a combination of piezoelectric and vibration velocity detectors is used. Seabed seismic exploration technology may be further divided into Ocean Bottom Cable (OBC) exploration technology and Ocean Bottom Node (OBN) seismograph exploration technology. The OBC technology connects a plurality of detectors to the submarine cables, and a specialized payoff boat sinks the acquisition cable to the seafloor (one or more submarine cables) under the guidance of a locator. One end of the submarine cable is connected to the stationary instrument vessel (the instrument vessel must drop front and rear anchors at sea to ensure that the vessel body does not turn and the vessel position does not deviate). The seismic vessel collects submarine seismic data by shooting around the sea surface according to the designed survey line.

At present, there are two main modes for acquiring submarine seismic data. One is submerging a one-component, two-component, three-component, or four-component submarine seismic data acquisition cable (OBC) on the ocean bottom to acquire the seismic data. The other is submerging a stand-alone three-component or four-component submarine seismic data acquisition station (OBS and OBN) on the ocean bottom to acquire the seismic data. The two modes use a stand-alone marine seismic airgun as an excitation source while being towed in the water. Various OBC, OBS, and OBN produced by companies such as ION, Sercel, Fairfield, and OYOGeospace are independent submarine seismic data acquisition cables and submarine seismic data acquisition stations.

The OBN technology is a technology that involves placing nodal seismic instruments underwater without cables for power and communication. Each nodal seismic instrument operates autonomously, independent of other nodes, and may continuously collect data for several months. OBN data acquisition is performed by two vessels: a source vessel and a separate vessel for the deployment and recovery of nodal seismic instruments. Nodal seismic instruments may be laid out and spaced without constraints, making the nodal seismic instruments suitable for comprehensive angular surveys. When the nodal seismic instruments are laid, ropes or steel wire cables may be attached to each instrument to facilitate recovery, similar to fishermen recovering long strings of crab cages. When the nodal seismic instruments are laid to the seabed at a water depth of several kilometers, it is not feasible to attach the nodal seismic instruments along the rope lines or steel wire cables. Generally, the ROV carries the nodal seismic instruments to the seabed and deploys the nodal seismic instruments according to the coordinates of the designated measurement points. When recovering the nodal seismic instruments, the ROV dives to the seabed to recover the deep-water nodal seismic instruments one by one.

Real-time power supply or battery charging for the instruments is not possible as no power and communication cables connected to the seabed nodal seismic instruments. Consequently, the instruments need to carry a large number of rechargeable batteries to ensure long-term operation on the seabed, which increases the production cost, size, and weight of the nodal seismic instruments, and also limits the ability to locate the nodal seismic instruments deployed on the seabed, monitor the real-time working status, transmit the collected data in real-time (the instruments may only conduct blind data collection), or provide timing for the nodal seismic instruments working on the seabed. The instruments may only rely on expensive atomic clock chips for timing. However, long-term work on the seabed can introduce timing errors due to the time drift of the atomic clock chips.

Fiber optic geophones have advantages such as high sensitivity, wide bandwidth, good high-frequency response, flat frequency characteristic response, linear phase change, good consistency in technical parameters, stable and reliable performance, no need for electricity or active power, and resistance to corrosion and high temperatures, representing the development direction of the geophone technology. Fiber optic geophones have higher sensitivity and better high-frequency response characteristics compared to conventional ones. Fiber optic geophones may support multi-channel, large data volume, and high-speed transmission. In addition, due to the absence of front-end electronic components, fiber optic geophones have higher reliability, resistance to high temperature and high pressure, no need of power supply, waterproof and corrosion resistance, long-term deployment, resistance to electromagnetic interference, and low channel crosstalk.

SUMMARY

One or more embodiments of the present disclosure provide a method for acquiring seismic data of a four-component ocean bottom node (OBN), implemented by a system for acquiring seismic data of a four-component ocean bottom node (OBN). The system may comprise a plurality of ocean bottom submerged buoys, a plurality of ocean surface buoys, armored opto-electronic composite cables, a plurality of four-component OBN seismic data acquisition instruments, and an ocean surface seismic source vessel. The plurality of four-component OBN seismic data acquisition instruments may be deployed in an ocean bottom seismic data acquisition work area based on a pre-designed measurement grid. The plurality of ocean bottom submerged buoys may be deployed around the ocean bottom seismic data acquisition work area. The plurality of ocean bottom submerged buoys may correspond to the plurality of ocean surface buoys, respectively, and the plurality of ocean bottom submerged buoys may be connected to the plurality of ocean surface buoys by the armored opto-electronic composite cables. The ocean surface seismic source vessel may perform seismic source excitation below a water surface of the ocean bottom seismic data acquisition work area by an air gun seismic source towed at a stern of the vessel. Each of the plurality of ocean bottom submerged buoys may be provided with a hydroacoustic signal emission source with a built-in long baseline positioning system, a short baseline positioning system, or an ultra-short baseline positioning system, and a rechargeable battery. Each of the plurality of ocean surface buoys may be provided with a built-in GPS and a BeiDou satellite signal receiving antenna, a solar panel, a photoelectric conversion module, and a composite modulation and demodulation (modem) instrument. Each of the armored opto-electronic composite cables may be provided with a cable, and an outer layer of the each of the armored opto-electronic composite cables may be encased with a high-strength sheath braided with Kevlar fibers or an armor twisted with one or more layers of stainless steel wires. The cables may include continuous grating optical fibers, single-mode and multi-mode optical fibers, coaxial cables, and twisted power supply cables. A top of each of the plurality of four-component OBN seismic data acquisition instruments may be provided with a hydroacoustic transponder. The each of the plurality of four-component OBN seismic data acquisition instruments may be a conventional four-component OBN seismic data acquisition instrument equipped with a built-in three-component conventional geophone and a piezoelectric hydrophone, or a fiber optic four-component OBN seismic data acquisition instrument. Each of the plurality of four-component OBN seismic data acquisition instruments may include a pressurized chamber. The pressurized chamber may be provided with a three-component fiber optic geophone, a fiber optic acoustic pressure hydrophone, a three-component attitude sensor, a semiconductor light source, an internal opto-electronic conversion module, a modem module, a pre-amplification and A/D conversion module, a data storage module, and a rechargeable battery module. The method may comprise controlling installations of the plurality of ocean bottom submerged buoys, including placing four ocean bottom submerged buoys around the ocean bottom seismic data acquisition work area. Tail ends of the armored opto-electronic composite cables are connected with the plurality of ocean bottom submerged buoys, and head ends of the armored opto-electronic composite cables are connected with the plurality of ocean surface buoys. The method may also comprise controlling installations of the plurality of four-component OBN seismic data acquisition instruments, including laying the plurality of four-component OBN seismic data acquisition instruments to an ocean bottom of the ocean bottom seismic data acquisition work area by ropes, steel cables, or ROV based on coordinates of the pre-designed measurement grid. The method may also comprise activating instruments in the plurality of ocean bottom submerged buoys and the plurality of ocean surface buoys, and sending positioning signals and timing signals received by the GPS and BeiDou satellite signal receiving antennas of the plurality of ocean surface buoys to the plurality of ocean bottom submerged buoys via the armored opto-electronic composite cables. The method may also comprise transmitting, based on the plurality of ocean bottom submerged buoys, the positioning signals and the timing signals to waters surrounding the plurality of four-component OBN seismic data acquisition instruments via the hydroacoustic signal emission sources. The method may also comprise receiving, based on the hydroacoustic transponders installed on the tops of the plurality of four-component OBN seismic data acquisition instruments, the positioning signals and the timing signals emitted from the plurality of ocean bottom submerged buoys, respectively, to perform accurate positioning and uninterrupted real-time timing. The method may also comprise the optical fibers within the armored opto-electronic composite cables being connected with the composite modem instruments within the plurality of ocean surface buoys to obtain real-time and uninterrupted water temperature data, pressure data, density data, and salt saturation data along the armored opto-electronic composite cables from the ocean surface to locations of the plurality of ocean bottom submerged buoys. The method may also comprise calculating real-time and three-dimensional water temperature data, pressure data, density data, and salt saturation data within waters of a whole measurement work area through interpolation by using the water temperature data, the pressure data, the density data, and the salt saturation data measured by all the armored opto-electronic composite cables from the ocean surface to the locations of plurality of ocean bottom submerged buoys. The method may also comprise performing real-time hydroacoustic velocity correction for each hydroacoustic propagation trajectory from the each of the plurality of ocean bottom submerged buoys to the each of the plurality of four-component OBN seismic data acquisition instruments based on a hydroacoustic propagation trajectory between an accurate location of the each of the plurality of four-component OBN seismic data acquisition instruments and the each of the plurality of ocean bottom submerged buoys by using the calculated real-time and three-dimensional water temperature data, the pressure data, the density data, and the salt saturation data within the waters of the ocean bottom seismic data acquisition work area. The method may further comprise performing real-time correction on the positioning data and the timing data of the each of the plurality of four-component OBN seismic data acquisition instruments by using an amount of real-time hydroacoustic velocity correction performed for the each hydroacoustic propagation trajectory from the each of the plurality of ocean bottom submerged buoys to the each of the plurality of four-component OBN seismic data acquisition instruments, to ensure that the positioning date and timing accuracy of the each of the plurality of four-component OBN seismic data acquisition instruments meets measurement error requirements of the measurement work area.

One or more embodiments of the present disclosure provide a device for acquiring seismic data of a four-component ocean bottom node (OBN). The device may comprise at least one storage device configured to store computer instructions, and at least one processor configured to execute the computer instructions or part of instructions to perform the method for acquiring the seismic data of the four-component OBN One or more embodiments of the present disclosure provide a non-transitory computer-readable storage medium comprising computer instructions that, when read by a computer, may direct the computer to perform the method for acquiring the seismic data of the four-component OBN.

BRIEF DESCRIPTION OF THE DRAWINGS

The present disclosure will be further illustrated by way of example embodiments, which will be described in detail with the accompanying drawings. These embodiments are non-limiting. In these embodiments, the same count indicates the same structure, wherein.

DETAILED DESCRIPTION

Figure 1:
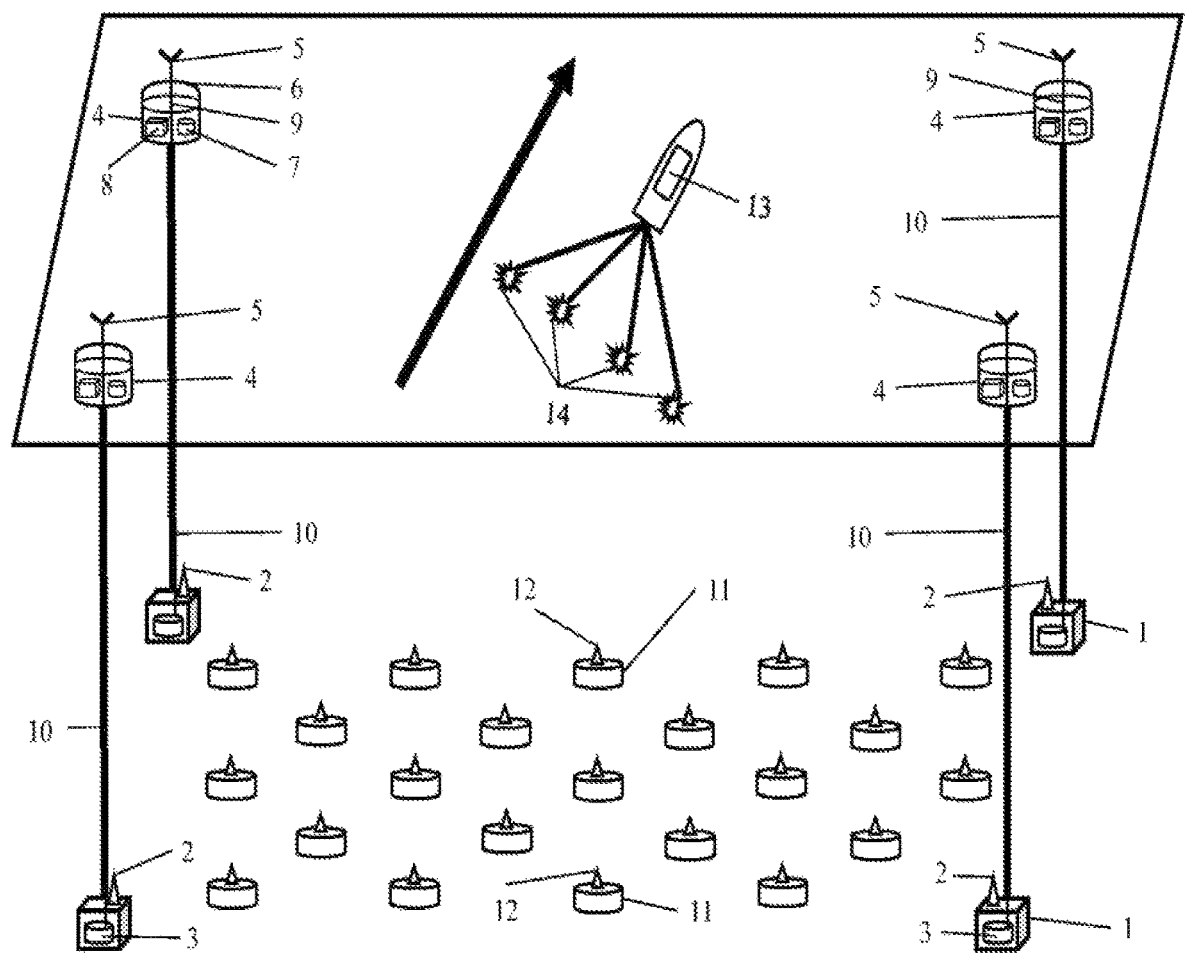
FIG. 1 is a schematic diagram illustrating a deployment of a system for acquiring seismic data of a four-component OBN according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

In view of the technical problems of existing submarine nodal seismic instruments that accurate positioning cannot be realized and atomic clocks are expensive and have timing drift, some embodiments of the present disclosure provide a system and a method for acquiring seismic data of a four-component OBN, which overcomes the problems in the prior art that real-time accurate positioning and accurate timing of the submarine nodal seismic instrument during operation cannot be realized, and atomic clock chips which are expensive and are unable to avoid timing drift can be substituted.

According to the system and the method for acquiring the seismic data of the four-component OBN provided by some embodiments of the present disclosure, the fiber optic sensors have advantages of high sensitivity, wide bandwidth, good high-frequency response, a flat frequency characteristic response, linear phase change, good consistency of technical parameters, stable and reliable performance, no requirement for electricity or active power, corrosion resistance, and high temperature resistance, becoming a direction of the development of the seismic geophone technology. The fiber optic geophones have higher sensitivity and better high frequency response characteristics than conventional geophones, and may achieve multi-channel, large data volume and high-speed transmission. In addition, due to the absence of front-end electronic components, the fiber optic geophones have higher reliability, resistance to high temperature and high pressure, no need of power supply, waterproof and corrosion resistance, long-term deployment, resistance to electromagnetic interference, and low channel crosstalk, thereby overcoming the defects of low sensitivity, small dynamic range, limited signal bandwidth, and large power consumption of conventional electronic geophones and piezoelectric hydrophones.

FIG. 1 is a schematic diagram illustrating a deployment of a system for acquiring seismic data of a four-component OBN according to some embodiments of the present disclosure.

As shown in FIG. 1, the system 100 for acquiring the seismic data of the four-component OBN may include a plurality of ocean bottom submerged buoys 1, hydroacoustic signal emission sources 2, rechargeable batteries 3, a plurality of ocean surface buoys 4, BeiDou satellite signal receiving antennas 5, solar panels 6, photoelectric conversion modules 7, composite modulation and demodulation (modem) instruments 8, cables 9, armored opto-electronic composite cables 10, a plurality of four-component OBN seismic data acquisition instruments 11, hydroacoustic transponders 12, an ocean surface seismic source vessel 13, and an air gun seismic source 14 towed at a stern of the vessel.

For ease of illustration, the four-component OBN seismic data acquisition instruments may be referred to as the acquisition instruments below.

In some embodiments, the plurality of acquisition instruments may be disposed in an ocean bottom seismic data acquisition work area based on a pre-designed measurement grid. The ocean bottom seismic data acquisition work area refers to a three-dimensional area enclosed by the plurality of ocean bottom submerged buoys, the plurality of ocean surface buoys, and the armored opto-electronic composite cables.

In some embodiments, the plurality of ocean bottom submerged buoys may be deployed around the ocean bottom seismic data acquisition work area. Each of the plurality of ocean bottom submerged buoys may be provided with a hydroacoustic signal emission source with a built-in long baseline positioning system, a short baseline positioning system, or an ultra-short baseline positioning system, and the rechargeable battery.

In some embodiments, each of the plurality of ocean surface buoys may be provided with a built-in GPS and the BeiDou satellite signal receiving antenna, the solar panel, the photoelectric conversion module, and the composite modem instrument.

In some embodiments, each of the armored opto-electronic composite cables may be provided with the cable. An outer layer of the each of the armored opto-electronic composite cables may be encased with a high-strength sheath braided with Kevlar fibers or an armor twisted with one or more layers of stainless steel wires. The cables may include continuous grating optical fibers, single-mode and multi-mode optical fibers, coaxial cables, and twisted power supply cables In some embodiments, the plurality of ocean bottom submerged buoys may correspond to the plurality of ocean surface buoys, and the plurality of ocean bottom submerged buoys and the plurality of ocean surface buoys may be connected by the armored opto-electronic composite cables.

In some embodiments, a top of each of the acquisition instruments may be provided with the hydroacoustic transponder. The each of the acquisition instruments may be a conventional four-component OBN seismic data acquisition instrument equipped with a built-in three-component conventional geophone and a piezoelectric hydrophone, or a fiber optic four-component OBN seismic data acquisition instrument In some embodiments, the each of the acquisition instruments may include a pressurized chamber. The pressurized chamber may be provided with a three-component fiber optic geophone, a fiber optic acoustic pressure hydrophone, a three-component attitude sensor, a semiconductor light source, an internal opto-electronic conversion module, a modem module, a pre-amplification and A/D conversion module, a data storage module, and a rechargeable battery module.

In some embodiments, the ocean surface seismic source vessel may perform source excitation below a water surface of the ocean bottom seismic data acquisition work area by an air gun seismic source towed at a stern of the vessel.

In some embodiments, the system for acquiring the seismic data of the four-component OBN may further include an acquisition instrument adjustment device, and a processor.

The acquisition instrument adjustment device refers to a device for adjusting, mounting and controlling the acquisition instruments to ensure that the acquisition instruments accurately acquire data in a target area. In some embodiments, the acquisition instrument adjustment device may be a submarine operation robot, which may stand by on the ocean surface seismic source vessel when carrying out exploration work, dive to the seabed to work when the acquisition instruments need to be deployed and adjusted, and return to the ocean surface seismic source vessel at the end of the work.

In some embodiments, the acquisition instrument adjustment device may include at least a remote operated vehicle (ROV), and a robotic arm. The robotic arm may be mounted on the ROV. In some embodiments, the ROV may carry the robotic arm that is used to position the plurality of acquisition instruments.

In some embodiments, the acquisition instrument adjustment device may adjust the acquisition instruments to predetermined locations if positioning data of the acquisition instruments affect exploration results. More descriptions may be found in FIG. 2 and related descriptions thereof.

The processor is an electronic device or chip configured to execute an instruction sequence defined in an instruction set architecture. The instruction sequence may include an arithmetic operation, a logical operation, data transmission, and control operation. In some embodiments, the processor refers to a device or component of the system for acquiring the seismic data of the four-component OBN for processing the seismic data. The processor may be mainly configured to receive, store, analyze, and process the seismic data from the acquisition instruments to extract useful information and features. In some embodiments, the processor may be deployed on the ocean surface seismic source vessel or another data processing center (e.g., a vessel processing data at sea, a ground data processing center, etc.).

In some embodiments of the present disclosure, positional adjustment of the acquisition instruments performed by the acquisition instrument adjustment device can ensure an accurate relative position between the acquisition instruments and the ocean surface seismic source vessel, which is conducive to obtaining accurate seismic data. In addition, the seismic data can be extracted and analyzed in time by the processor, which is conducive to the smooth and reliable conduct of the marine seismic exploration work.

In some embodiments, the method for acquiring the seismic data of the four-component OBN may be realized using the system for acquiring the seismic data of the four-component OBN. The method for acquiring the seismic data of the four-component OBN may include the following operations.

In step (a), installations of the plurality of ocean bottom submerged buoys may be controlled, including placing four ocean bottom submerged buoys around the ocean bottom seismic data acquisition work area. Tail ends of the armored opto-electronic composite cables may be connected with the plurality of ocean bottom submerged buoys, and head ends of the armored opto-electronic composite cables may be connected with the plurality of ocean surface buoys.

In step (b), installations of the acquisition instruments may be controlled, including laying the acquisition instruments to an ocean bottom of the ocean bottom seismic data acquisition work area by ropes, steel cables, or ROV based on coordinates of the pre-designed measurement grid.

In some embodiments, the coordinates of the pre-designed measurement grid may be determined by a predetermined position sequence of optimal deployment data.

Deployment data refers to layout data related to the acquisition instruments, such as a count and locations of acquisition instruments.

The optimal deployment data refers to deployment data of the acquisition instruments capable of realizing optimal exploration results. In some embodiments, the optimal deployment data may include the count of acquisition instruments and the predetermined location sequence for realizing the optimal exploration results. The predetermined location sequence is a sequence consisting of the predetermined locations. The predetermined locations refer to locations of the acquisition instruments corresponding to the optimal exploration results. In some embodiments, the processor may obtain the predetermined locations based on a location determination model. More descriptions may be found in FIG. 3 and related descriptions thereof.

In step (c), instruments in the plurality of ocean bottom submerged buoys and the plurality of ocean surface buoys may be activated, and positioning signals and timing signals received by the GPS and BeiDou satellite signal receiving antennas of the plurality of ocean surface buoys may be sent to the plurality of ocean bottom submerged buoys via the armored opto-electronic composite cables.

The instruments in the plurality of ocean bottom submerged buoys and the plurality of ocean surface buoys may be devices used for communication between the plurality of ocean bottom submerged buoys and the plurality of ocean surface buoys. In some embodiments, the instruments may send the positioning signals and the timing signals received by the GPS or the Beidou satellite signal receiving antennas of the plurality of ocean surface buoys to the plurality of ocean bottom submerged buoys via the armored opto-electronic composite cables to achieve applications such as oceanographic measurements and navigation.

The positioning signals are signals that provide accurate location information. The timing signals are signals that provide accurate time information.

In step (d), the positioning signals and the timing signals may be transmitted to waters surrounding the acquisition instruments via the hydroacoustic signal emission sources.

In step (e), the positioning signals and the timing signals emitted from the plurality of ocean bottom submerged buoys may be received, respectively, based on the hydroacoustic transponders installed on the tops of the acquisition instruments to perform accurate positioning and uninterrupted real-time timing.

In operations (c)-(e), the GPS or BeiDou satellite signal receiving antenna of the plurality of ocean surface buoys may receive the positioning signal and the timing signal and send the positioning signal and the timing signal to the plurality of ocean bottom submerged buoys via the armored opto-electronic composite cables. The plurality of ocean bottom submerged buoys may transmit the positioning signals and the timing signals through the hydroacoustic signal emission sources, and then the hydroacoustic transponders of the acquisition instruments may receive and process the signals to realize positioning and timing functions of the acquisition instruments.

In some embodiments, the positioning signals and the timing signals may correspond in a one-to-one manner. The positioning signals may be configured determine the locations of the acquisition instruments. The timing signals may be configured to determine time corresponding to the locations of the acquisition instruments.

In some embodiments, the processor may determine positioning frequencies of the hydroacoustic transponders based on seawater flow rate data, and a seismic source operation status.

The seawater flow rate data is information about the speed of water currents in the ocean. In some embodiments, the seawater flow rate data may be obtained by various measurement devices (e.g., a flow meter, sonar, etc.).

The seismic source operation status is a description of an operation status of an air gun seismic source. For example, the seismic source operation status may include "operating" and "not operating."

The positioning frequency is a frequency at which the hydroacoustic transponder accurately positions the hydroacoustic transponder. For example, the positioning frequency may be once per second, etc.

In some embodiments, the hydroacoustic transponders may process the received the positioning signals and the timing signals in various ways to achieve accurate positioning and uninterrupted real-time timing of the hydroacoustic transponders. For example, the hydroacoustic transponders may determine accurate locations of the hydroacoustic transponders using algorithms such as polygonal positioning and determine time of arrival of the signals by calculating, for example, a propagation distance and a propagation speed of the signals.

In some embodiments, the processor may determine the positioning frequencies of the hydroacoustic transponders in various ways based on the seawater flow rate data, and the seismic source operation status.

For example, the processor may determine the positioning frequencies of the hydroacoustic transponders based on a relationship that the seawater flow rate data is proportional to the positioning frequency and a positioning frequency of a seismic source whose operational status is in operation is greater than a positioning frequency of a seismic source whose operational status is not in operation.

Merely by way of example, the positioning frequencies of the hydroacoustic transponders may be determined by the following formula (I):

$$h = m \times v \tag{I}$$

wherein h denotes the positioning frequency of the hydroacoustic transponder, v denotes the seawater flow rate data, and m denotes a coefficient of the seawater flow rate data. A magnitude of m may be related to the seismic source operation status, and a correlation may be that a value of m of the seismic source whose operation status is in operation is greater than a value of m whose seismic source operation status is not in operation.

In some embodiments, the processor may also construct a first feature vector based on the seawater flow rate data, the seismic source operation status, and seismic construction data, obtain a first reference vector whose vector distance from the first feature vector is less than a first distance threshold by retrieving in a vector database based on the first feature vector, and determine the positioning frequency of the hydroacoustic transponder corresponding to the first reference vector as a current positioning frequency.

The vector database may include a large number of first reference vectors and positioning frequencies corresponding to the first reference vectors. The first reference vectors may be constructed based on historical seawater flow rate data, historical seismic source operation statuses, and historical seismic construction data. The positioning frequencies corresponding to the first reference vectors may be historical actual positioning frequencies. The vector distance may include, but is not limited to, a Euclidean distance or the like. The first distance threshold may be set by a technician based on experience or set by default by the system.

The seismic source construction data refers to data related to the air gun seismic source used in construction of marine seismic exploration. In some embodiments, the seismic construction data may include a model of the air gun seismic source, an amount of air used, or the like.

In some embodiments of the present disclosure, the positioning frequencies of the hydroacoustic transponders may be reasonably determined based on the seawater flow rate data and the seismic source operation status, so that timely positioning may be realized while avoiding useless data and waste of resources due to excessive positioning frequencies of the hydroacoustic transponders.

In step (f), optical fibers within the armored opto-electronic composite cables may be connected with the composite modem instruments within the plurality of ocean surface buoys to obtain real-time and uninterrupted water temperature data, pressure data, density data, and salt saturation data along the armored opto-electronic composite cables from the ocean surface to locations of the plurality of ocean bottom submerged buoys.

In some embodiments, the water temperature data, the pressure data, the density data, and the salt saturation data may be measured by the optical fibers within the armored opto-electronic composite cables. The salt saturation data refers to a salt concentration of seawater. For example, if seawater contains 58 grams of salt per liter, the salt saturation data may be 5.8%.

In step (g), real-time and three-dimensional water temperature data, pressure data, density data, and salt saturation data within waters of a whole measurement work area may be calculated through interpolation by using the water temperature data, the pressure data, the density data, and the salt saturation data measured by all the armored opto-electronic composite cables from the ocean surface to the locations of plurality of ocean bottom submerged buoys.

The waters of the whole measurement work area refer to a water area in which an ocean bottom seismic data acquisition operation is conducted. In some embodiments, the area corresponding to the waters of the whole measurement work area may be greater than or equal to an area corresponding to the ocean bottom seismic data acquisition work area. Due to the phenomenon of stratification of seawater, the waters of the whole measurement work area may be divided into multiple layers corresponding to different water temperature data, pressure data, density data, and salt saturation data.

In some embodiments, the water temperature data, the pressure data, the density data, and the salt saturation data of seawater at various points along the armored opto-electronic composite cables from the sea surface to the locations of the plurality of ocean bottom submerged buoys may be obtained by the armored opto-electronic composite cables, and the water temperature data, the pressure data, the density data, and the salt saturation data for the multiple layers of the waters of the whole measurement work area may be obtained by performing interpolation on the data of various points corresponding to the multiple layers of the waters of the whole measurement work area using the plurality of armored opto-electronic composite cables. The interpolation algorithm may include, but is not limited to, linear interpolation, or the like.

In step (h), real-time hydroacoustic velocity correction may be for each hydroacoustic propagation trajectory from the each of the plurality of ocean bottom submerged buoys to the each of the acquisition instruments based on a hydroacoustic propagation trajectory between an accurate location of the each of the acquisition instruments and the each of the plurality of ocean bottom submerged buoys by using the calculated real-time and three-dimensional water temperature data, the pressure data, the density data, and the salt saturation data within the waters of the ocean bottom seismic data acquisition work area.

The hydroacoustic propagation trajectory is a path that sound waves take as traveling through the water body. In some embodiments, an acoustic path from one acquisition instrument to one ocean bottom submerged buoy may constitute a corresponding hydroacoustic propagation trajectory.

Hydroacoustic velocity is a velocity of sound waves as traveling through the water, such as, 1500 m/s. In some embodiments, the hydroacoustic velocity may be correlated to a temperature, a pressure, a density, a salt saturation, etc., of the water body. The hydroacoustic velocity may vary due to differences and variations in the temperature, the pressure, the density, the salt saturation, etc. of the water body.

In some embodiments, the processor may perform real-time correction on the hydroacoustic velocity by querying a first predetermined relationship table based on the water temperature data, the pressure data, the density data, and the salt saturation data. The first predetermined relationship table may include a correspondence between the water temperature data, the pressure data, the density data, the salt saturation data, and the hydroacoustic velocity. The first predetermined relationship table may be determined based on historical data. In some embodiments, the processor may determine a hydroacoustic velocity corresponding to the same or similar water temperature data, pressure data, density data, and salt saturation data in the table as the hydroacoustic velocity by looking up the table.

Figure 4:
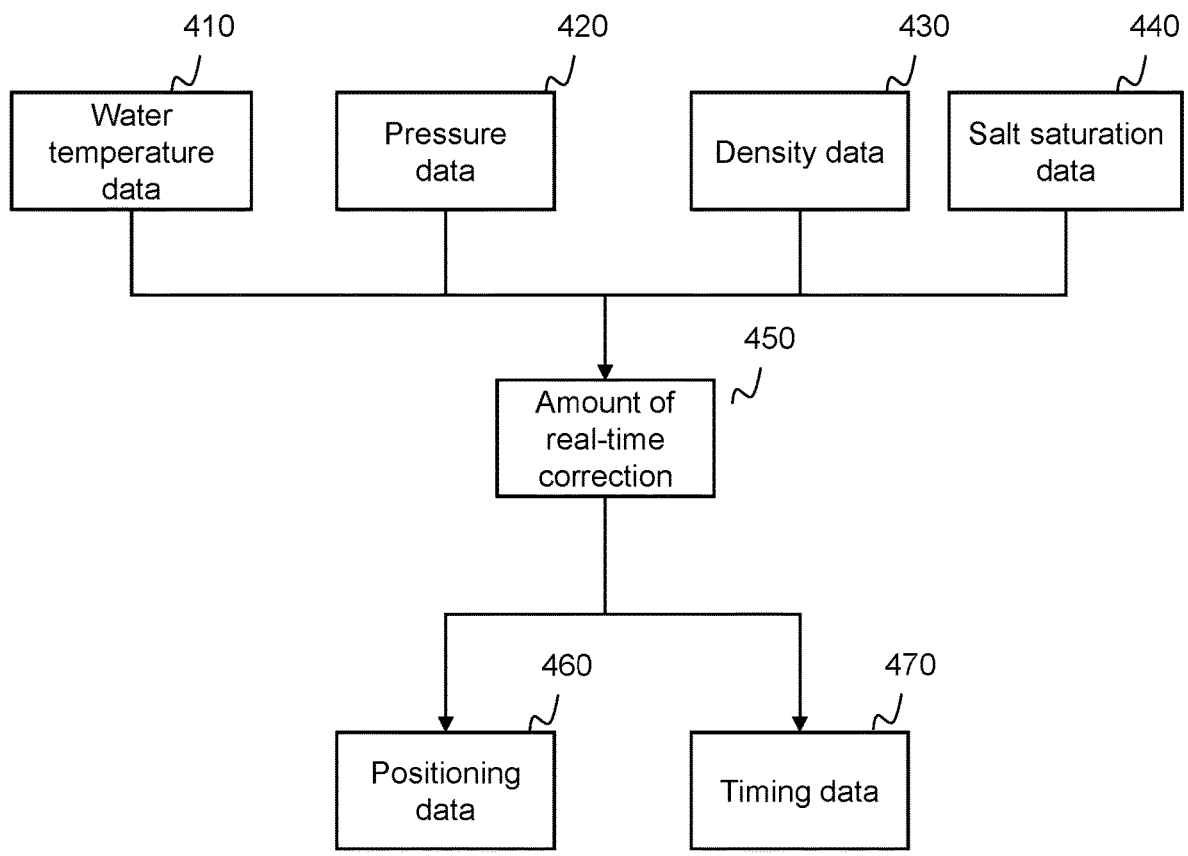
FIG. 4 is a schematic diagram illustrating an exemplary process of performing real-time correction on positioning data and timing data according to some embodiments of the present disclosure.

More descriptions regarding performing real-time correction on the hydroacoustic velocity may be found in FIG. 4 and related descriptions thereof.

In step (i), real-time correction may be performed on the positioning data and the timing data of the each of the acquisition instruments by using an amount of real-time hydroacoustic velocity correction performed for the each hydroacoustic propagation trajectory from the each of the plurality of ocean bottom submerged buoys to the each of acquisition instruments, to ensure that the positioning data and timing accuracy of the each of the acquisition instruments meets measurement error requirements of the measurement work area.

The positioning data of the acquisition instruments is data provided by the hydroacoustic transponders on the locations of the acquisition instruments. For example, the positioning data may be coordinates that include latitude, longitude, and elevation.

The timing data of the acquisition instruments is time information provided by the hydroacoustic transponders for acquisition of the data by the acquisition instruments.

More descriptions regarding the amount of real-time correction and performing the real-time correction may be found in FIG. 4 and related descriptions thereof.

The positioning accuracy is a degree of accuracy between the positioning data and an actual location. In some embodiments, the positioning accuracy may be expressed in terms of a distance between the positioning data and the actual location. In some embodiments, the smaller the positioning accuracy of the acquisition instruments, the smaller the error between the positioning data and the actual location, that is, the more accurate the positioning. When the positioning accuracy meets construction design requirements, the acquisition instruments may start data acquisition. If the positioning accuracy does not meet the construction design requirements, the acquisition instruments may be redeployed until the construction design requirements are met.

The timing accuracy is a degree of accuracy between the timing data and actual time. In some embodiments, the timing accuracy may be expressed in units such as milliseconds, microseconds, or the like. In some embodiments, the smaller the timing accuracy of the acquisition instruments, the smaller the error between the timing data and the actual time, that is, the more accurate the timing.

The measurement error requirements refer to requirements related to the positioning accuracy and the timing accuracy of the acquisition instruments. In some embodiments, the measurement error requirements may be preset by a technician based on experience or set by default by the system. For example, the measurement error requirements may include a positioning accuracy of less than 1 m and a timing accuracy of less than 0.1 millisecond.

In some embodiments, the processor may perform real-time correction on the positioning data and the timing data of each acquisition instrument using a real-time correction amount of the hydroacoustic velocity of each hydroacoustic propagation trajectory, so that the corrected positioning data and timing data are closer to the actual location and the actual time than the positioning data and the timing data before correction, thereby ensuring that the positioning accuracy and the timing accuracy meet the measurement error requirements of the measurement work area to the greatest extent.

Figure 2:
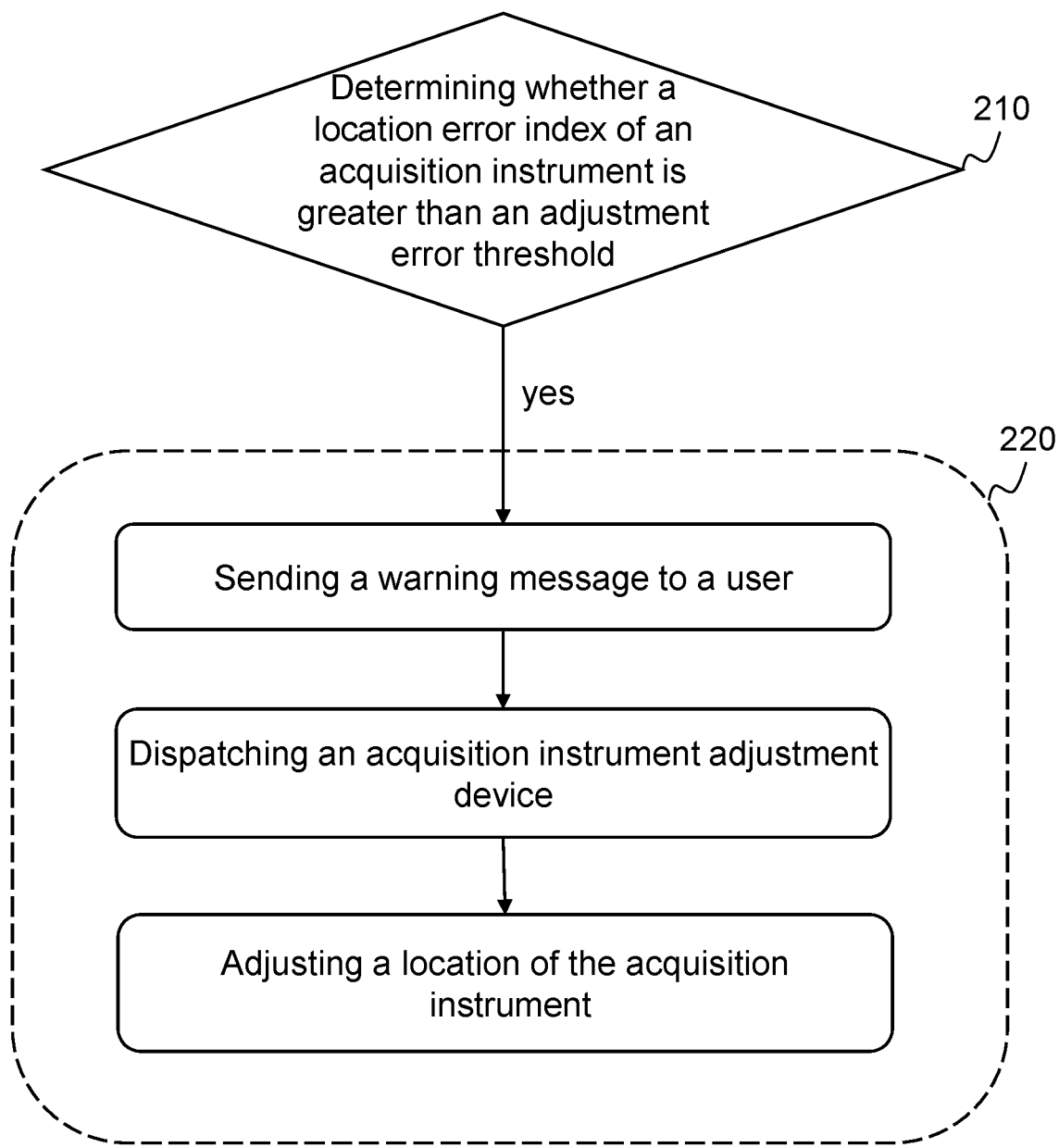
FIG. 2 is a flowchart illustrating an exemplary process of adjusting locations o acquisition instruments according to some embodiments of the present disclosure.

In some embodiments of the present disclosure, the system and the method for acquiring the seismic data of the four-component OBN overcome the difficulty of not being able to perform accurate positioning and accurate timing on the acquisition instruments in real time during operation, replaces the atomic clock chip which is expensive and unable to avoid timing drift, and drastically reduces the manufacturing cost of the system for acquiring the seismic data of the four-component OBN, thereby establishing a good foundation and powerful technical support for large-scale popularization of application of acquisition of the seismic data of the four-component OBN FIG. 2 is a flowchart illustrating an exemplary process of adjusting locations of acquisition instruments according to some embodiments of the present disclosure. In some embodiments, as shown in FIG. 2, a process 200 may include the following operations. In some embodiments, the process 200 may be executed by a processor.

In 210, whether a location error index of the acquisition instrument is greater than an adjustment error threshold may be determined.

The location error index is a metric index used to measure a degree of deviation between positioning data of the acquisition instruments and predetermined locations. More descriptions regarding the positioning data and the predetermined locations may be found in FIG. 1 and related descriptions thereof.

In some embodiments, the processor may obtain the location error index based on various ways. For example, the processor may determine the location error index based on a total amount of location errors and a count of deviations by weighted summation. The formula (II) for weighted summation may be represented by:

$$R = k_1 \times a + k_2 \times b \quad (II)$$

Wherein R denotes the location error index, a denotes the total amount of location errors, b denotes the count of deviations, and $k_1$ and $k_2$ denote weight coefficients corresponding to the total amount of location errors and the count of deviations, respectively, which may be set by a technician based on experience or set by default by the system.

The total amount of location errors is a sum of differences between the positioning data of the acquisition instruments and the predetermined locations. In some embodiments, the total amount of location errors may be represented by a sum of distances between the plurality of positioning data and the predetermined locations. The distance is a distance between the positioning data and the predetermined location corresponding to the same acquisition instrument.

The count of deviations is a count of acquisition instruments that are not in the predetermined locations due to the deviations. In some embodiments, the count of offsets may be determined by counting the count of all acquisition instruments whose positioning data is not at the predetermined locations.

The adjustment error threshold is a threshold used to determine whether the location error index is within an acceptable range.

In some embodiments, when the location error index is greater than the adjustment error threshold, it means that the difference between the positioning data and the predetermined position of the acquisition instrument may have a significant impact on an exploration effect, and further adjustment may be required.

In some embodiments, the processor may determine the adjustment error threshold in various ways. For example, the adjustment error threshold may be se by a technician based on experience or set by default by the system.

In some embodiments, the adjustment error threshold may be determined based on target depth data, a count of acquisition instruments, and seawater flow rate data.

The target depth data is depth data at the locations of the acquisition instruments. In some embodiments, the target depth data refers to a depth from the sea level to the seabed, or refers to a depth from the acquisition instruments to the sea level.

The count of acquisition instruments refers to a count of acquisition instruments deployed on the seabed.

More descriptions regarding the seawater flow rate data may be found in FIG. 1 and related descriptions thereof.

In some embodiments, the processor may construct a second feature vector based on the target depth data, the count of acquisition instruments, and the seawater flow rate data, obtain a second reference vector whose a vector distance from the second feature vector is less than a second distance threshold by retrieving a vector database based on the second feature vector, and determine an adjustment error threshold corresponding to the second reference vector as a current adjustment error threshold.

The vector database may include a large number of second reference vectors and adjustment error thresholds corresponding to the second reference vectors. The second reference vectors may be constructed based on historical target depth data, historical count of acquisition instruments, and historical seawater flow rate data. The adjustment error thresholds corresponding to the second reference vectors may be historical adjustment error thresholds. In some embodiments, the larger the historical target depth data, the greater the count of historical acquisition instruments, and the faster the historical seawater flow rate data, the greater the historical adjustment error threshold corresponding to the second reference vector. The vector distance may include, but is not limited to, a Euclidean distance, or the like. The second distance threshold may be set by a technician based on experience or set by default by the system.

In some embodiments of the present disclosure, the adjustment error thresholds of the acquisition instruments can be reasonably determined based on the target depth data, the count of acquisition instruments, and the seawater flow rate data, so that unnecessary positional adjustments of the acquisition instruments can be avoided while timely correcting the deviations and guaranteeing the quality of the acquired data, thereby saving resources and time.

In 220, an warning message may be sent to a user to remind the user to dispatch the acquisition instrument adjustment device to adjust the locations of the acquisition instruments.

The warning message is a message used to warn of the need to adjust the locations of the acquisition instruments.

In some embodiments, the warning message may include numbers, the positioning data, and the predetermined locations of the acquisition instruments. For example, the warning message may be a text "Warning: Number 1 is located at $(X_1, Y_1, Z_1)$ and the predetermined location is $(X_2, Y_2, Z_2)$."

In some embodiments, the warning message may be used to remind the user to dispatch the acquisition instrument adjustment device to adjust the locations of the acquisition instruments.

In some embodiments, the processor may send the warning message to the user in response to a determination that the location error index of the acquisition instrument is greater than the adjustment error threshold.

In some embodiments, the processor may also send the warning message to the user in response to a determination that an output of a seismic source location determination layer of a location determination model is a special identifier.

The location determination model is a model used to determine optimal operation data. In some embodiments, the location determination model may be a machine learning model with a customized structure as described below, or may be another neural network model. For example, the location determination model could be a convolutional neural network (CNN).

The optimal operation data refers to an optimal emission location that enables the seismic waves emitted by the ocean surface seismic source vessel to achieve an optimal exploration effect when seismic exploration work is carried out. More descriptions regarding the optimal operation data may be found in the relevant descriptions below.

The seismic source location determination layer is a model used to determine operation data of the ocean surface seismic source vessel. The special identifier is an identifier used to represent deployment data does not meet the standard (e.g., insufficient count of acquisition instruments, disorganized locations, etc.). For example, the special identifier may be a text "Unable to determine an operation location," etc.

Figure 3:
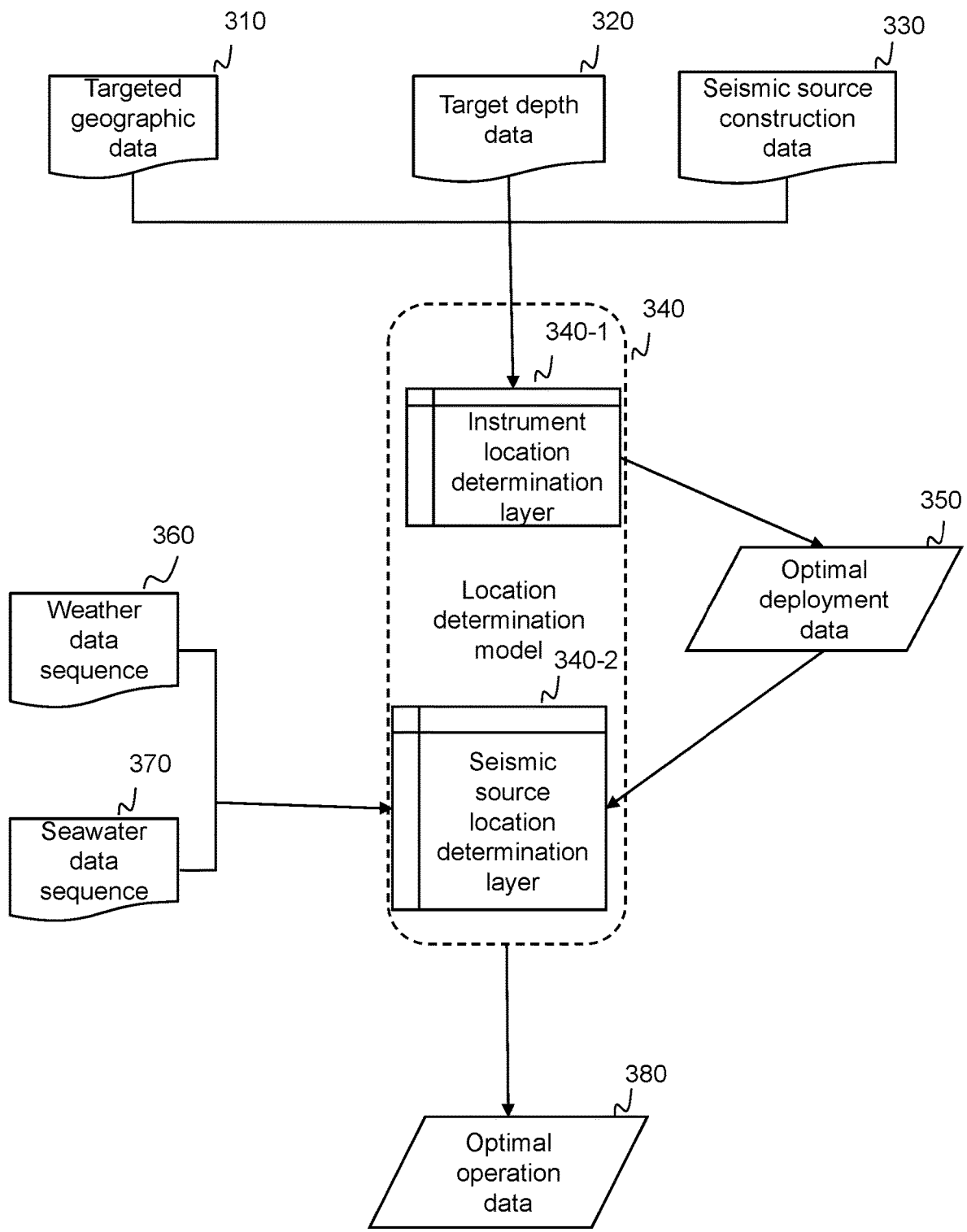
FIG. 3 is schematic diagram illustrating an exemplary location determination model according to some embodiments of the present disclosure.

More descriptions regarding the location determination model, the seismic source location determination layer, and the special identifier may be found in FIG. 3 and related descriptions thereof.

In some embodiments, the processor may send the warning message to the user to remind the user to dispatch the acquisition instrument adjustment device to adjust the acquisition instruments to the predetermined locations by the robotic arm carried by the ROV.

In some embodiments of the present disclosure, when the output of the seismic source location determination layer is the special identifier, the processor may send the warning message to the user to remind the user to dispatch the acquisition instrument adjustment device in time and adjust the acquisition instruments to the preset locations, thereby effectively avoiding the error of the acquired data caused by positional deviation and waste of resources.

In some embodiments of the present disclosure, in response to a determination that the processor determines that the location error index of the acquisition instrument is greater than the adjustment error threshold, the processor may send the warning message the user, so that the acquisition instruments can be accurately adjusted to the predetermined locations, and the accuracy of subsequently acquired seismic data can be improved.

It should be noted that the above description of the process 200 is merely intended to be exemplary and illustrative and does not limit the scope of application of the present disclosure. For those skilled in the art, various corrections and variations may be made to the process 200 under the guidance of the present disclosure. However, such corrections and variations remain within the scope of the present disclosure.

In some embodiments, the processor may determine the optimal deployment data of the acquisition instruments; and determine the optimal operation data for the ocean surface seismic source vessel based on the optimal deployment data.

More descriptions regarding the optimal deployment data and the optimal operation data may be found in the related descriptions of FIGS. 1-2.

In some embodiments, the processor may obtain the optimal operation data based on the seismic source location determination layer of the location determination model. More descriptions may be found in FIG. 3 and related descriptions thereof.

In some embodiments of the present disclosure, the deployment of the acquisition instruments that may achieve the optimal exploration effect can be reasonably determined by the optimal deployment data; and the optimal operation data of the ocean surface seismic source vessel can be determined by the optimal deployment data, thereby improving the accuracy of the acquired seismic data.

FIG. 3 is a schematic diagram illustrating an exemplary location determination model according to some embodiments of the present disclosure.

In some embodiments, as shown in FIG. 3, a location determination model 340 may include an instrument location determination layer 340-1 and a seismic source location determination layer 340-2.

The instrument location determination layer 340-1 refers to a model used to determine deployment data of acquisition instruments. In some embodiments, the instrument location determination layer 340-1 may be a machine learning model. For example, the instrument location determination layer may be a CNN, etc.

In some embodiments, an input of the instrument location determination layer 340-1 may include targeted geographic data 310, target depth data 320, and seismic construction data 330, and an output of the instrument location determination layer 340-1 may include optimal deployment data 350.

The targeted geographic data 310 is data related to geographic locations of the acquisition instruments. In some embodiments, the targeted geographic data may include the geographic locations, terrain data, a predicted stratigraphic structure, or the like. The predicted stratigraphic structure may be searched and retrieved based on the geographic locations.

More descriptions regarding the target depth data and the seismic construction data may be found in FIG. 1 and related descriptions thereof.

In some embodiments, the instrument location determination layer of the location determination model may be obtained by training an initial instrument location determination layer based on a large number of first training samples. The first training samples for training the instrument location determination layer may include sample targeted geographic data, sample target depth data, and sample seismic construction data. First labels are actual optimal deployment data corresponding to the first training samples.

In some embodiments, the processor may select the targeted geographic data, the target depth data, and the seismic construction data corresponding to operations with relatively good exploration effects from historical operations as the first training samples, and the actual optimal deployment data corresponding to the operations as the first labels.

In some embodiments, the processor may input the first training samples with the first labels into an initial instrument location determination layer to obtain initial optimal deployment data; construct a first loss function based on the initial optimal deployment data and the first labels, and iteratively update parameters of the initial instrument location determination layer based on the plurality of the first training samples, so as to cause the first loss function of the initial instrument location determination layer to satisfy a predetermined condition. For example, the predetermined condition may include that the first loss function converges, or the first loss function value is less than a predetermined value. The training may be completed when the first loss function satisfies the predetermined condition, and a trained instrument location determination layer may be obtained.

The seismic source location determination layer 340-2 refers to a model used to determine the operation data of the ocean surface seismic source vessel. In some embodiments, the seismic source location determination layer 340-2 may be a machine learning model. For example, the seismic source location determination layer may be a recurrent neural network (RNN), etc.

In some embodiments, an input of the seismic source location determination layer 340-2 may include the optimal deployment data 350, a weather data sequences 360, and a seawater data sequences 370, and an output of the seismic source location determination layer may include optimal operational data 380.

The weather data sequences 360 is a sequence consisting of weather data at a plurality of times from a current time to a future time. The weather data may include precipitation, a wind direction, etc. In some embodiments, the future time may be manually set or set by system default, e.g., the future time refers to a week in the future, 15 days in the future, and so on. In some embodiments, the processor may obtain the weather data sequences based on another data platform (e.g., a weather forecast app, etc.).

The seawater data sequence 370 refers to a sequence consisting of seawater data of a plurality of locations from the sea level to the seabed in a vertical direction. The seawater data may include density data, seawater flow rate data, or the like. In some embodiments, the plurality of locations may be determined based on a fixed interval, which may be manually set or set by system default, e.g., 500 m, 1000 m, etc. In some embodiments, the processor may obtain the seawater data sequence based on a related device (e.g., optical fibers within the armored opto-electronic composite cables, etc.).

In some embodiments, the seismic source location determination layer of the location determination model may be obtained by training based on a large number of second training samples. The second training sample for training the seismic source location determination layer may include sample optimal deployment data, sample weather data sequences, and sample seawater data sequences. Second labels are actual optimal deployment data corresponding to the second training samples.

In some embodiments, the processor may select the optimal deployment data, the weather data sequences, and the seawater data sequences corresponding to operations with relatively good exploration effects from historical operations as the second training samples, and the actual optimal deployment data corresponding to the operations as the second labels.

When the actual optimal operational data of the historical operations is used as the second labels, the optimal deployment data, the weather data sequence, and the seawater data sequence corresponding to the actual optimal operational data may be positive samples; and when samples after feature substitution (e.g., changing the deployment data, i.e., changing a count and locations of the acquisition instruments) are used as negative samples, corresponding labels may be special identifiers. More descriptions regarding the special identifier may be found in FIG. 2 and related descriptions thereof.

In some embodiments, a training process of the seismic source location determination layer may be similar to a training process of the instrument location determination layer, which may be found in the related descriptions above and is not repeated here.

In some embodiments, in response to a determination that the location error index of the acquisition instrument is greater than a recalculation error threshold and less than the adjustment error threshold, the processor may determine recalculation operation data of the ocean surface seismic source vessel based on current deployment data of the acquisition instrument.

The recalculation error threshold is a threshold of a location error index used to determine whether the ocean surface seismic source vessel needs to be readjusted.

In some embodiments, the processor may determine the recalculation error threshold by querying a second predetermined relationship table based on the adjustment error threshold. The second predetermined relationship table may include a correspondence between the adjustment error threshold and the recalculation error threshold. The second predetermined relationship table may be determined based on historical data. The correspondence between the adjustment error threshold and the recalculation error threshold may be that the larger the adjustment error threshold, the larger the recalculation error threshold, and the recalculation error threshold is less than the adjustment error threshold.

The current deployment data is deployment data of the acquisition instruments at a current time. In some embodiments, the current deployment data may include a current count and locations of the acquisition instruments.

The recalculated optimal deployment data refers to a re-determined optimal emission location during the seismic exploration work to enable the seismic waves emitted by the ocean surface seismic source vessel to achieve the optimal exploration effect.

In some embodiments, the processor may output the recalculated operation data based on the current deployment data, the weather data sequence, and the seawater data sequence through the seismic source location determination layer of the location determination model. More descriptions regarding the seismic source location determination layer may be found in FIG. 3 and related descriptions thereof.

In some embodiments of the present disclosure, when the location error index of the acquisition instrument is greater than the recalculation error threshold and less than the adjustment error threshold, the acquisition instrument may not be adjusted, and the recalculated operation data of the ocean surface seismic source vessel may be determined based on the current deployment data of the acquisition instrument to readjust the location of the ocean surface seismic source vessel in time, thereby reducing the count of adjustments made to the acquisition instrument due to minor deviations in multiple explorations, and reducing waste of resources and saving time.

FIG. 4 is a schematic diagram illustrating an exemplary process of performing real-time correction on positioning data and the timing data according to some embodiments of the present disclosure.

In some embodiments, as shown in FIG. 4, a processor may perform real-time correction on the positioning data and the timing data for each acquisition instrument, including: determining an amount of real-time correction 450 on a hydroacoustic velocity based on water temperature data 410, pressure data 420, density data 430, and salt saturation data 440 of seawater from the ocean surface to locations of a plurality of ocean bottom submerged buoys; and performing real-time correction on positioning data 460 and timing data 470 of each acquisition instrument based on the amount of real-time correction 450.

The amount of real-time correction is real-time correction data of the hydroacoustic velocity. In some embodiments, the amount of real-time correction refers to a sequence of real-time correction data of hydroacoustic velocities at a plurality of locations on a hydroacoustic propagation trajectory.

In some embodiments, the processor may determine the amount of real-time correction on the hydroacoustic velocity in various ways based on the water temperature data, the pressure data, the density data, and the salt saturation data. For example, the processor may determine the amount of real-time correction on the hydroacoustic velocity based on a correction amount determination model.

The correction amount determination model is a model used to determine the amount of real-time correction. In some embodiments, the correction amount determination model may be a machine learning model. For example, the correction amount determination model may be deep neural network (DNN), etc.

In some embodiments, an input of the correction volume determination model may include the water temperature data, the pressure data, the density data, the salt saturation data, and hydroacoustic propagation trajectory, and an output of the correction volume determination model may include the amount of real-time correction. More descriptions regarding the water temperature data, the pressure data, the density data, the salt saturation data and the hydroacoustic propagation trajectory may be found in FIG. 1 and related descriptions thereof.

In some embodiments, the correction amount determination model may be obtained by training based on a large number of third training samples. The third training samples for the training correction amount determination model may include sample water temperature data, sample pressure data, sample density data, sample salt saturation data, and sample hydroacoustic propagation trajectories. Third labels are actual amount of real-time correction corresponding to the third training samples.

In some embodiments, the processor may select the water temperature data, the pressure data, the density data, the salt saturation data, and hydroacoustic propagation trajectories from a plurality of historical operations as the third training samples, and the actual amount of real-time correction corresponding to the third training samples as the third labels.

In some embodiments, a training process of the correction amount determination model may be similar to a training process of the instrument location determination layer, which may be found in the related descriptions of FIG. 3 and is not repeated here.

In some embodiments, the processor may perform he real-time correction on the positioning data of each acquisition instrument in various ways based on the amount of real-time correction.

For example, the processor may determine corrected positioning data of the acquisition instruments of the hydroacoustic transponders by performing weighted summation of the current positioning data and the amount of real-time correction based on a relationship that the greater the amount of real-time correction on the hydroacoustic velocity, the greater the amount of the corrected positioning data.

Merely by way of example, the corrected positioning data may be determined by the following formula (III).

$$D_2 = k_3 \times D_1 + k_4 \times S \tag{III}$$

Wherein $D_1$ and $D_2$ denote the current positioning data and the corrected positioning data, respectively, S denotes the amount of real-time correction of the hydroacoustic velocity, $k_3$ and $k_4$ denote a coefficient of the current positioning data and a coefficient of the amount of real-time correction of hydroacoustic velocity, respectively, and $k_3$ and $k_4$ may be set artificially by a technician based on experience or set by default by the system.

In some embodiments, the processor may perform real-time correction on the timing data of each acquisition instrument in various ways based on the amount of real-time correction.

For example, the processor may determine the corrected timing data of the acquisition instruments by performing weighted summation of the current timing data and the amount of real-time correction based on a relationship that the greater the amount of real-time correction on the hydroacoustic velocity, the greater the corrected timing data. Merely by way of example, the weighted summation formula is the same as formula (III) above and is not repeated herein.

In some embodiments of the present disclosure, the amount of real-time correction of the hydroacoustic velocity may be determined using the machine learning model, so that real-time correction of the positioning data and the timing data of the acquisition instruments can be realized, thereby making the positioning data and the timing data more accurate, and improving the accuracy of subsequent acquisition of the seismic data.

One or more embodiments of the present disclosure provide a device for acquiring seismic data of a four-component ocean bottom node (OBN). The device may comprise at least one memory and at least one processor. The at least one memory may be configured to store computer instructions. The at least one processor may be configured to execute the whole or part of computer instructions to implement the method for acquiring the seismic data of the four-component OBN.

One or more embodiments of the present disclosure provide a non-transitory computer-readable storage medium comprising computer instructions that, when read by a computer, may direct the computer to execute the method for acquiring the seismic data of the four-component OBN.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for data acquisition of a system for acquiring seismic data of a four-component ocean bottom node (OBN), implemented by the system for acquiring the seismic data of the four-component ocean bottom node (OBN), the system comprising a plurality of ocean bottom submerged buoys, a plurality of ocean surface buoys, armored opto-electronic composite cables, a plurality of four-component OBN seismic data acquisition instruments, and an ocean surface seismic source vessel; wherein the plurality of four-component OBN seismic data acquisition instruments are deployed in an ocean bottom seismic data acquisition work area based on a pre-designed measurement grid;

the plurality of ocean bottom submerged buoys are deployed around the ocean bottom seismic data acquisition work area, the plurality of ocean bottom submerged buoys being corresponding to the plurality of ocean surface buoys, respectively, and the plurality of ocean bottom submerged buoys being connected to the plurality of ocean surface buoys by the armored opto-electronic composite cables;

the ocean surface seismic source vessel performs seismic source excitation below a water surface of the ocean bottom seismic data acquisition work area by an air gun seismic source towed at a stern of the vessel;

each of the plurality of ocean bottom submerged buoys is provided with a hydroacoustic signal emission source with a built-in long baseline positioning system, a short baseline positioning system, or an ultra-short baseline positioning system, and a rechargeable battery;

each of the plurality of ocean surface buoys is provided with a built-in GPS and a BeiDou satellite signal receiving antenna, a solar panel, a photoelectric conversion module, and a composite modulation and demodulation (modem) instrument;

each of the armored opto-electronic composite cables is provided with a cable, and an outer layer of the each of the armored opto-electronic composite cables is encased with a high-strength sheath braided with Kevlar fibers or an armor twisted with one or more layers of stainless steel wires, and the cables include continuous grating optical fibers, single-mode and multi-mode optical fibers, coaxial cables, and twisted power supply cables;

a top of each of the plurality of four-component OBN seismic data acquisition instruments is provided with a hydroacoustic transponder, the each of the plurality of four-component OBN seismic data acquisition instruments is a conventional four-component OBN seismic data acquisition instrument equipped with a built-in three-component conventional geophone and a piezoelectric hydrophone, or a fiber optic four-component OBN seismic data acquisition instrument; and the each of the plurality of four-component OBN seismic data acquisition instruments includes a pressurized chamber, the pressurized chamber is provided with a three-component fiber optic geophone, a fiber optic acoustic pressure hydrophone, a three-component attitude sensor, a semiconductor light source, an internal opto-electronic conversion module, a modem module, a pre-amplification and A/D conversion module, a data storage module, and a rechargeable battery module; wherein the method comprises:

firstly, placing four ocean bottom submerged buoys around the ocean bottom seismic data acquisition work area, wherein tail ends of the armored opto-electronic composite cables are connected with the plurality of ocean bottom submerged buoys, and head ends of the armored opto-electronic composite cables are connected with the plurality of ocean surface buoys;

laying the plurality of four-component OBN seismic data acquisition instruments to an ocean bottom of the ocean bottom seismic data acquisition work area by ropes, steel cables, or ROV based on coordinates of the pre-designed measurement grid;

activating instruments in the plurality of ocean bottom submerged buoys and the plurality of ocean surface buoys, and sending positioning signals and timing signals received by the GPS and BeiDou satellite signal receiving antennas of the plurality of ocean surface buoys to the plurality of ocean bottom submerged buoys via the opto-electronic composite cables;

transmitting, by the plurality of ocean bottom submerged buoys, the positioning signals and the timing signals to waters surrounding the plurality of four-component OBN seismic data acquisition instruments via the hydroacoustic signal emission sources;

receiving, by the hydroacoustic transponders installed on the tops of the plurality of four-component OBN seismic data acquisition instruments, the positioning signals and the timing signals emitted from the plurality of ocean bottom submerged buoys, respectively, to perform accurate positioning and uninterrupted real-time timing;

the optical fibers within the armored opto-electronic composite cables are connected with the composite modem instruments within the plurality of ocean surface buoys to obtain real-time and uninterrupted water temperature, pressure, density, and salt saturation of seawater along the armored opto-electronic composite cables from the ocean surface to locations of the plurality of ocean bottom submerged buoys;

calculating real-time and three-dimensional water temperature, pressure, density, and salt saturation values of seawater within waters of a whole measurement work area through interpolation by using the water temperature data, the pressure data, the density data, and the salt saturation data measured by all the armored opto-electronic composite cables from the ocean surface to the locations of plurality of ocean bottom submerged buoys;

performing real-time hydroacoustic velocity correction for each hydroacoustic propagation trajectory from the each of the plurality of ocean bottom submerged buoys to the each of the plurality of four-component OBN seismic data acquisition instruments based on a hydroacoustic propagation trajectory line between an accurate location of the each of the plurality of four-component OBN seismic data acquisition instruments and the each of the plurality of ocean bottom submerged buoys by using the calculated real-time and three-dimensional water temperature, pressure, density, and the salt saturation values of seawater within the waters of the ocean bottom seismic data acquisition work area; and performing real-time correction on the positioning data and the timing data of the each of the plurality of four-component OBN seismic data acquisition instruments by using an amount of real-time hydroacoustic velocity correction performed for the each hydroacoustic propagation trajectory from the each of the plurality of ocean bottom submerged buoys to the each of the plurality of four-component OBN seismic data acquisition instruments, to ensure that the positioning data and timing accuracy of the each of the plurality of four-component OBN seismic data acquisition instruments meets measurement error requirements of the measurement work area.

* * * * *